US008496729B2

United States Patent
Kang et al.

(10) Patent No.: US 8,496,729 B2
(45) Date of Patent: Jul. 30, 2013

(54) PROCESS GAS PURIFICATION DEVICE FOR A MELT REDUCTION SYSTEM FOR EXTRACTING PIG IRON

(75) Inventors: Sin-Myoung Kang, Pohang (KR); Johannes Leopold Schenk, Linz (AT); Martin Schmidt, Leonding (AT); Kurt Wieder, Schwertberg (AT); Johann Wurm, Bad Zell (AT)

(73) Assignees: Siemens Vai Metals Technologies GmbH (AT); Posco (KR)

( * ) Notice: Subject to any disclaimer, the term of this patent is extended or adjusted under 35 U.S.C. 154(b) by 346 days.

(21) Appl. No.: 13/000,688

(22) PCT Filed: May 27, 2009

(86) PCT No.: PCT/EP2009/056417
§ 371 (c)(1),
(2), (4) Date: Feb. 23, 2011

(87) PCT Pub. No.: WO2009/156238
PCT Pub. Date: Dec. 30, 2009

(65) Prior Publication Data
US 2011/0146485 A1 Jun. 23, 2011

(30) Foreign Application Priority Data
Jun. 27, 2008 (AT) ................................ A 1026/2008

(51) Int. Cl.
*C21B 7/002* (2006.01)
(52) U.S. Cl.
USPC ................... 75/468; 95/216; 96/355; 75/496
(58) Field of Classification Search
USPC .............. 75/468, 496–498; 96/252
See application file for complete search history.

(56) References Cited

U.S. PATENT DOCUMENTS

| 4,699,655 | A | * | 10/1987 | Milionis | ...................... 75/492 |
| 4,793,857 | A | | 12/1988 | Vuletic | ............................. 75/34 |

(Continued)

FOREIGN PATENT DOCUMENTS

| DE | 102006048600 A1 | 4/2008 |
| EP | 0183677 A2 | 6/1986 |

(Continued)

OTHER PUBLICATIONS

International Search Report dated Aug. 13, 2009, issued in corresponding international application No. PCT/EP2009/056417.

(Continued)

*Primary Examiner* — Duane Smith
*Assistant Examiner* — Phillip Shao
(74) *Attorney, Agent, or Firm* — Ostrolenk Faber LLP (57) ABSTRACT

Process gas purification device (2) for a melt reduction system (1) comprising at least one reduction reactor (3) and a melting gasification reactor (4), a first line system (5) for discharging a furnace gas (6) from the reduction reactor (3) and a second line system (7) for discharging a generator gas (8) from the melting gasification reactor (4) wherein both line systems (5,7) lead to a respective wet scrubbing system (11, 12). The furnace gas or generator gas flow can be throttled preferably by way of a control element (41) that varies a control gap (40) and the scrubber or cooling liquid (49) can be collected and drained. The first wet scrubber system (11) of the first line system (5) for routing the furnace gas (6) and the second Venturi scrubber system (12) of the second line system (7) for routing the generator gas (8) both discharge into a common mist elimination device (14).

12 Claims, 5 Drawing Sheets

U.S. PATENT DOCUMENTS

| | | | |
|---|---|---|---|
| 4,850,574 A * | 7/1989 | Vuletic | 266/146 |
| 5,320,676 A | 6/1994 | Greenwalt | |
| 5,407,179 A | 4/1995 | Whipp | |
| 5,435,832 A * | 7/1995 | Kepplinger et al. | 75/500 |
| 5,453,115 A | 9/1995 | Vuletic | |
| 6,251,162 B1 | 6/2001 | Eichberger et al. | |
| 6,960,238 B2 | 11/2005 | Kepplinger et al. | 75/380 |
| 2003/0159541 A1 | 8/2003 | Kepplinger et al. | |
| 2009/0090217 A1 | 4/2009 | Vuletic | |
| 2010/0043599 A1 * | 2/2010 | Hauzenberger et al. | 75/573 |

FOREIGN PATENT DOCUMENTS

| | | |
|---|---|---|
| EP | 0606573 A1 | 7/1994 |
| SU | 1561828 | 4/1990 |
| UA | 73357 C2 | 2/2003 |
| WO | WO 2007/124870 A | 11/2007 |

OTHER PUBLICATIONS

Hans Bodo Lüngen et al., "State of the art of the direct reduction and smelting reduction processes", Stahl and Eisen 126, vol. 7 (2006), pp. 25-26, 28, 30, 32, 34-38 and 40, XP-001500339.

* cited by examiner

PROCESS GAS PURIFICATION DEVICE FOR A MELT REDUCTION SYSTEM FOR EXTRACTING PIG IRON

CROSS-REFERENCE TO RELATED APPLICATIONS

The present application is a 35 U.S.C. §§371 national phase conversion of PCT/EP2009/056417, filed May 27, 2009 which claims priority of Austrian Application No. A1026/2008 filed Jun. 27, 2008, the contents of which are incorporated by reference herein. The PCT International Application was published in the German language.

The invention relates to a process gas cleaning device for a smelting reduction installation for obtaining pig iron, comprising a reduction reactor and a melter gasifier, wherein a first line system for carrying away a blast-furnace gas from the reduction reactor and a second line system for carrying away a generator gas from the melter gasifier are provided, wherein pre-scrubbing devices for pre-cleaning the blast-furnace gas and the generator gas are preferably arranged within the first and second line systems and wherein the first and second line systems respectively lead to a wet scrubber system, which is preferably formed as an annular-gap scrubber system and in which the blast-furnace gas or the generator gas can be subjected to scrubbing or cooling liquid and the throughflow of the blast-furnace gas or of the generator gas can be throttled by means of one or more control elements varying a control gap and wherein the scrubbing or cooling liquid introduced into the wet scrubber systems and mixed with impurities or dusts of the blast-furnace gas or of the generator gas can be collected and removed. The invention also relates to a corresponding method.

PRIOR ART

A smelting reduction installation used for obtaining pig iron or primary steel products comprises, in a way that is known for example from the COREX or FINEX process, two systems arranged in series, to be specific one or more reduction reactors and a melter gasifier.

The reduction reactor according to the COREX process is a vessel in the form of a shaft into which metallurgical charge materials or pieces of lump ore (primarily oxidative iron ores) are filled together with any additives through an opening in the hood region.

The reduction reactor has in its bottom region a discharge opening, through which the metallurgical charge materials can be charged into the melter gasifier arranged underneath the reduction reactor by means of a conveying device. Arranged in the hood region of the reduction reactor is a second opening, which is used for connecting a first line system, which serves for carrying away blast-furnace gas.

The melter gasifier is a vessel which has a refractory lining on its inside and the hood region of which has three openings. A first opening is used for transporting metallurgical charge materials into the melter gasifier. A second opening is used for transporting coal or material containing carbon into the melter gasifier by means of a charging device.

An oxygen line is used to supply oxygen in the hearth region of the melter gasifier, whereby the carbon-containing materials used are gasified and a process gas is generated inside the melter gasifier, referred to hereafter as generator gas. The generator gas primarily comprises carbon monoxide and hydrogen and is removed through a second line system, using a third opening in the hood region of the melter gasifier. The predominant fraction of the generator gas removed in such a way can be rendered usable as reduction process gas and introduced into the reduction reactor by way of a supply line. The metallurgical charge materials kept in the reduction reactor are chemically reduced by the gassing with the generator gas or the oxidative iron ores are reduced to what is known as "sponge iron". By means of the conveying device, this solid sponge iron is then continuously sent down a dropping shaft into the melter gasifier, where it undergoes final reduction or smelting. In a way similar to in the case of a conventional blast-furnace process, the molten pig iron accumulates together with slag in the bottom region of the melter gasifier and can finally be tapped off from the latter. The pig iron is further processed into steel in a steel works by refining processes or is used as a direct product in the form of cast iron.

In the melter gasifier, it is endeavored to maintain a constant operating pressure of usually 4-5 bar. Operation under increased pressure is favorable for economic reasons, since the specific output of the reactors per unit volume increases with pressure. It is therefore necessary to arrange within the second line system a pressure control system, by means of which the operating pressure of the melter gasifier is kept constant.

For the purpose of such operating pressure control, part of the generator gas rendered usable primarily as a reduction process gas for the reduction reactor or reactors is passed by way of a second wet scrubber system and removed from the second line system and fed into an export gas line or into a storage tank. This reactor gas removed from the second line system is referred to as "excess gas".

It goes without saying that, in an efficiently operating smelting reduction installation, the smallest possible fraction of generator gas should flow away. The outflow of a certain amount of generator gas as "excess gas" (usually about 2000 to 10000 m$^3$/h) is unavoidable, however, in order to reliably control the operating pressure in the melter gasifier.

Both the blast-furnace gas, also referred to as "top gas", removed from the reduction reactor or reactors and the generator gas, or "excess gas", removed from the second line system are respectively cleaned and cooled in a wet scrubber system. For this, a first wet scrubber system is provided in the first line system for cleaning or cooling the blast-furnace gas, while a second wet rubber system is provided in the second line system for cleaning or cooling the generator gas. Each of these wet scrubber systems may comprise any number of wet scrubbers arranged one behind the other or one next to the other.

The preferred embodiment for wet scrubbers is that of annular-gap scrubbers of the design known as the Venturi type, with an axially adjustable, conical control element in a flue provided as a Venturi throat. However, wet scrubbers of the type in question may also be configured in an alternative way. For instance, the use of an adjustable flap within the flue instead of a conical control element would be conceivable.

In the case of the present exemplary embodiment of the process gas cleaning device according to the invention, generic annular-gap scrubbers of the Venturi type are used.

Formed between the control element and the flue of the annular-gap scrubber is a control gap, which can be made larger or smaller by axial displacement of the control element.

Arranged upstream of the control element, sometimes even within the control gap, is a nozzle device for injecting a scrubbing or cooling liquid, by means of which the approaching blast-furnace gas or generator gas is sprayed.

By means of the scrubbing or cooling liquid, the blast-furnace gas or generator gas, which is usually already pre-cooled and pre-cleaned in pre-scrubbing devices, is further cooled and cleaned, the pre-scrubbing devices primarily performing a cooling function, while the actual cleaning of the blast-furnace gas or generator gas is primarily undertaken by the wet scrubber systems.

A process gas cleaning plant of a smelting reduction installation according to the prior art is set out in such a way that the first wet scrubber system of the first line system, carrying the blast-furnace gas, and the second wet scrubber system of the second line system, carrying the generator gas, are respectively followed downstream by their own droplet separating device.

Each of these droplet separating devices has a housing, which is possibly provided with internal baffles and by means of which the scrubbing or cooling liquid introduced into the respective wet scrubber system and mixed with impurities or dusts of the blast-furnace gas or of the generator gas is collected and removed by way of an outflow provided in the bottom region of the droplet separating device.

Using an outlet opening in a housing of the droplet separating device, the blast-furnace gas or generator gas scrubbed and cooled in the wet scrubber systems is sent in the direction of the export gas line, from where the process gases obtained from the process gas cleaning system are passed on for further use, for example for generating energy or heat in generators or heating installations.

According to the prior art, the first wet scrubber system therefore opens out in a first droplet separating device, while the second wet scrubber system opens out in a second droplet separating device.

Such provision of two droplet separating devices is complex and takes up a lot of space in a plant tower provided for the purpose. This is disadvantageous in particular in the case of retrofitting already existing iron and steel works with COREX/FINEX technology, since only limited space is available.

Usually, the second wet scrubber system here comprises two annular-gap scrubbers, wherein a first feed line of the second line system opens out into a first annular-gap scrubber of the second wet scrubber system and a second feed line of the second line system opens out into a second annular-gap scrubber of the second wet scrubber system. Both the first feed line and the second feed line of the second line system are provided here with a shut-off valve.

Depending on the amount of generator gas respectively produced, one of the shut-off valves or one of the feed lines is opened and the amount of generator gas is thereby optionally passed to the first annular-gap scrubber or to the second annular-gap scrubber. One of the two annular-gap scrubbers is designed for rather small amounts of generator gas to flow through, while the other annular-gap scrubber is designed for larger amounts of generator gas to flow through. Depending on a respectively given amount of generator gas, either the first annular-gap scrubber or the second annular-gap scrubber is used for cleaning or cooling the generator gas. Such a pressure control system therefore requires the provision of a number of annular-gap scrubbers and is consequently complex to produce and maintain.

SUMMARY OF THE INVENTION

The aim of the present invention is to make simple and efficient process gas cleaning possible in the case of a two-stage smelting reduction installation.

In particular, the droplet separating system of the process gas cleaning installation is to be configured in such a way as to save as much space as possible and in such a way that it can be created with as little expenditure on components as possible. It is a further aim of the present invention to simplify the second wet scrubber system of the second line system carrying the generator gas. Here it is intended to provide a pressure control system that is as efficient as possible, by means of which the outflow of the amount of generator gas or "excess gas" removed from the second line system that is required for controlling the operating pressure of the melter gasifier is minimized.

According to the invention, these aims are achieved by a process gas cleaning device according to the invention and a corresponding method for process gas cleaning according to the invention.

The invention is directed at a process gas cleaning device for a smelting reduction installation for obtaining pig iron, comprising at least one reduction reactor and a melter gasifier, wherein a first line system is provided for carrying away a blast-furnace gas from at least one reduction reactor and a second line system is provided for carrying away a generator gas from the melter gasifier. While in the case of a smelting reduction installation operating on the basis of the COREX process, for example, only one reduction reactor is provided, it is also possible in the case of alternative smelting reduction installations, operating for example on the basis of the FINEX process, for a number of reduction reactors to be provided, for example arranged one behind the other, in which a staged pre-reduction of the metallurgical charge materials or pieces of lump ore takes place.

One or more pre-scrubbing devices for pre-cleaning the blast-furnace gas or the generator gas are preferably respectively arranged within the first and second line systems, wherein the first and second line systems respectively lead to a wet scrubber system, which is preferably configured as an annular-gap scrubber system and in which the blast-furnace gas or the generator gas can be subjected to scrubbing or cooling liquid and can be throttled by means of one or more control elements varying a control gap and wherein the scrubbing or cooling liquid introduced into the wet scrubber systems and mixed with impurities or dusts of the blast-furnace gas or of the generator gas can be collected and removed. It should be noted that a dry-operating dedusting device, such as for example a gas cyclone, an impingement separator or a filter, may also be arranged instead of the pre-scrubbing device to pre-clean the blast-furnace gas or the generator gas.

According to the invention, a common droplet separating device is provided, into which both the first wet scrubber system of the first line system, carrying the blast-furnace gas, and the second wet scrubber system of the second line system, carrying the generator gas, open out.

Therefore, now only a single droplet separating device is required to collect and remove the impurities and dusts of the "top gas" and of the "excess gas" bound by means of the scrubbing or cooling liquid.

Since the droplet separating device assigned to the second wet scrubber system was already highly overdimensioned in the case of process gas cleaning installations according to the prior art—these droplet separating devices had to be capable of dealing with short-term fluctuations in the amount of generator gas between 10 000 m$^3$/h and 200 000 m$^3$/h—a common droplet separating device according to the invention for the first and second wet scrubber systems, which therefore receives not only the generator gas but also the blast-furnace gas originating from the reduction reactor, only has to be dimensioned slightly larger than a droplet separator assigned according to the prior art to the second wet scrubber system alone.

The space which therefore becomes free as a result of the now eliminated droplet separator of the first wet scrubber system can therefore be used entirely for other devices associated with the smelting reduction installation, without resulting in a relevant increase in size of the space already taken up by the droplet separator and the second wet scrubber system.

In comparison with a process gas cleaning device according to the prior art, it is therefore possible to dispense with one droplet separating device, which results in a considerable saving in terms of space and weight. A droplet separating system according to the invention can be created with relatively little expenditure on components.

The blast-furnace gas removed from the at least one reduction reactor and the amount of generator gas removed from the melter gasifier are already swirled together within the common droplet separating device and, using a single outlet opening of the droplet separating device, this swirled process gas mixture can be fed as export gas directly into the export gas line or into a storage tank.

Although the amount of generator gas passed by way of the second wet scrubber system fluctuates considerably as a result of the process, a relatively constant inflow rate of the process gas mixture into the droplet separating device, and consequently also into the export gas line, can be achieved as a result of the mixing already taking place upstream of the droplet separating device of the amount of generator gas with the amount of blast-furnace gas (much greater in comparison with the amount of generator gas) passed by way of the first wet scrubber system.

A particularly compact type of construction is obtained in a preferred configurational variant of the invention by the first wet scrubber system and the second wet scrubber system and the droplet separating device being arranged in a common scrubbing tower.

According to a further preferred configurational variant of the invention, it is provided that a first outflow line, arranged downstream of the first wet scrubber system of the first line system, and a second outflow line, arranged downstream of the second wet scrubber system of the second line system, are brought together in a collector line portion, and this collector line portion opens out into the common droplet separating device. In this way, a blast-furnace gas/generator gas mixture with a uniform pressure level is already obtained before entry into the droplet separating device.

In a further preferred configurational variant of the invention, it is provided that the collector line portion opens out substantially tangentially into the peripheral region of a substantially cylindrically configured droplet separating device. In this way, a swirl is imparted to the blast-furnace gas or generator gas as it flows into the droplet separating device. By means of this swirling effect, the centrifugal force is rendered usable, to achieve better droplet separation.

According to a particularly preferred configurational variant of the invention, it is provided that the second line system is equipped in the region of a first feed line, arranged upstream of the second wet scrubber system, with a pressure control device, by means of which an operating pressure desired in the melter gasifier can be kept constant as a result of controlling the throughflow of the generator gas, wherein the second wet scrubber system has an unclosable leakage gap, through which a permanent outflow of generator gas is made possible—irrespective of the position of a preferably conically configured control element reducing or widening a control gap.

In a preferred configurational variant of the invention, a second feed line is provided here, arranged parallel to the first feed line and likewise leading to the second wet scrubber system, wherein the second feed line is equipped with a bypass valve, by means of which the second feed line can be closed in the case of an amount of generator gas passed through the second line system at a given time going below a defined amount of generator gas and by means of which the second feed line can be opened in the case of the occurrence of an amount of generator gas passed through the second line system at a given time going above the defined amount of generator gas—so that the operating pressure control can from then on be performed by adjusting the control element of the second wet scrubber system.

Since the control gap varied by the control element is never fully closed, on account of the necessity to remove condensed liquid occurring in the second line system, there is an undesired loss of generator gas, which of course is in fact intended to be used for a pre-reduction of the charge materials or pieces of lump ore located in the reduction reactor.

By means of a pressure control system according to the invention, with the provision of a bypass valve described, this loss of generator gas, which in the case of a smelting reduction installation according to the prior art is about 1000 $m^3/h$, can be significantly reduced. This is so since, in the case of relatively small amounts of generator gas brought up to the second wet scrubber system at a given time, the second feed line can be closed by means of the bypass valve, so that fine control of the amount of generator gas then flowing exclusively through the first feed line can take place by means of the pressure control device.

A further advantage of the pressure control system according to the invention is its flexibility. This is so since, even in the case of a sudden increase in pressure in the melter gasifier, and consequently a large amount of generator gas to be removed by way of the second wet scrubber system, this can be quickly removed in the direction of the export line by the bypass valve or the second feed line being opened. The pressure control is from then on performed by adjusting the control element of the second wet scrubber system or by varying the control gap.

Therefore, while the second wet scrubber system, intended for generator gas cleaning, usually comprises two annular gap scrubbers together with assigned feed lines, wherein, depending on an amount of generator gas respectively produced, one of the feed lines is opened by means of a shut-off valve and as a result the amount of generator gas is passed to the first annular gap scrubber or the second annular gap scrubber, according to the invention it is possible for one annular-gap scrubber to be eliminated.

In a preferred configurational variant of the invention, the second wet scrubber system, assigned to the second line system or the generator gas, therefore respectively has a single annular-gap scrubber or a single control element varying an annular gap.

In a further preferred configurational variant of the invention, the first line system is equipped in the region of a line portion arranged upstream of the first wet scrubber system with a flow control device, by means of which the inflow of the blast-furnace gas removed from the reduction reactor to the first wet scrubber system can be controlled.

The pressure of the export gas fed into the export line can be exactly controlled by a coordination of the pressure control system arranged upstream of the second wet scrubber system with the flow control device arranged upstream of the first wet scrubber system.

The invention concerns a method corresponding to the preceding claims for the process gas cleaning of a smelting reduction installation.

In a method for the process gas cleaning of a smelting reduction installation for obtaining pig iron, blast-furnace gas removed from one or more reduction reactors by means of a first line system and generator gas removed from a melter gasifier by means of a second line system are preferably respectively pre-cleaned and cooled by means of one or more pre-scrubbing devices and wherein the first and second line systems respectively lead to a wet scrubber system, in which the blast-furnace gas or the generator gas is subjected to scrubbing or cooling liquid, wherein the amount of through-flow of the blast-furnace gas or of the generator gas can respectively be throttled by means of one or more control elements varying a control gap and wherein the scrubbing or cooling liquid mixed with impurities of the blast-furnace gas or of the generator gas is collected and removed. According to the invention, it is provided that the blast-furnace gas passed by way of the first wet scrubber system and subjected to scrubbing or cooling liquid and the generator gas passed by way of the second wet scrubber system and subjected to scrubbing or cooling liquid are fed to a common droplet separating device.

In a preferred variant of the method, it is provided that the blast-furnace gas passed by way of the first wet scrubber system and the generator gas passed by way of the second wet scrubber system are already brought together before entry into the droplet separating device.

Here it is preferably provided that the process gas obtained upstream of the droplet separating device from the blast-furnace gas and the generator gas being brought together is passed substantially tangentially into the peripheral region of a substantially cylindrically configured droplet separating device.

In a further preferred variant of the method, it is provided that a pressure control of the generator gas is performed in the second line system in the region of a first feed line, arranged upstream of the second wet scrubber system, in order to keep an operating pressure desired in the melter gasifier constant, wherein a permanent outflow of generator gas is made possible in the second wet scrubber system by means of an unclosable leakage gap.

In a further preferred variant of the method, it is provided that the generator gas can be passed by way of a second feed line, arranged parallel to the first feed line and likewise leading to the second wet scrubber system, wherein the second feed line is closed by means of a bypass valve in the case of the occurrence of an amount of generator gas passed through the second line system at a given time going below a defined amount of generator gas, while the second feed line is opened by means of the bypass valve in the case of the occurrence of an amount of generator gas passed through the second line system at a given time going above the defined amount of generator gas, wherein the operating pressure control is from then on performed by means of adjusting a control element of the second wet scrubber system.

In a further preferred variant of the method, it is provided that a flow control of the blast-furnace gas is performed within the first line system in the region of a line portion arranged upstream of the first wet scrubber system.

The respective advantages of the process-engineering measures according to the invention have already been mentioned in the course of the preceding description of the apparatus.

BRIEF DESCRIPTION OF THE DRAWINGS

The invention is now explained in more detail on the basis of an exemplary embodiment. In the drawings.

DESCRIPTION OF A PREFERRED EMBODIMENT

Figure 1:
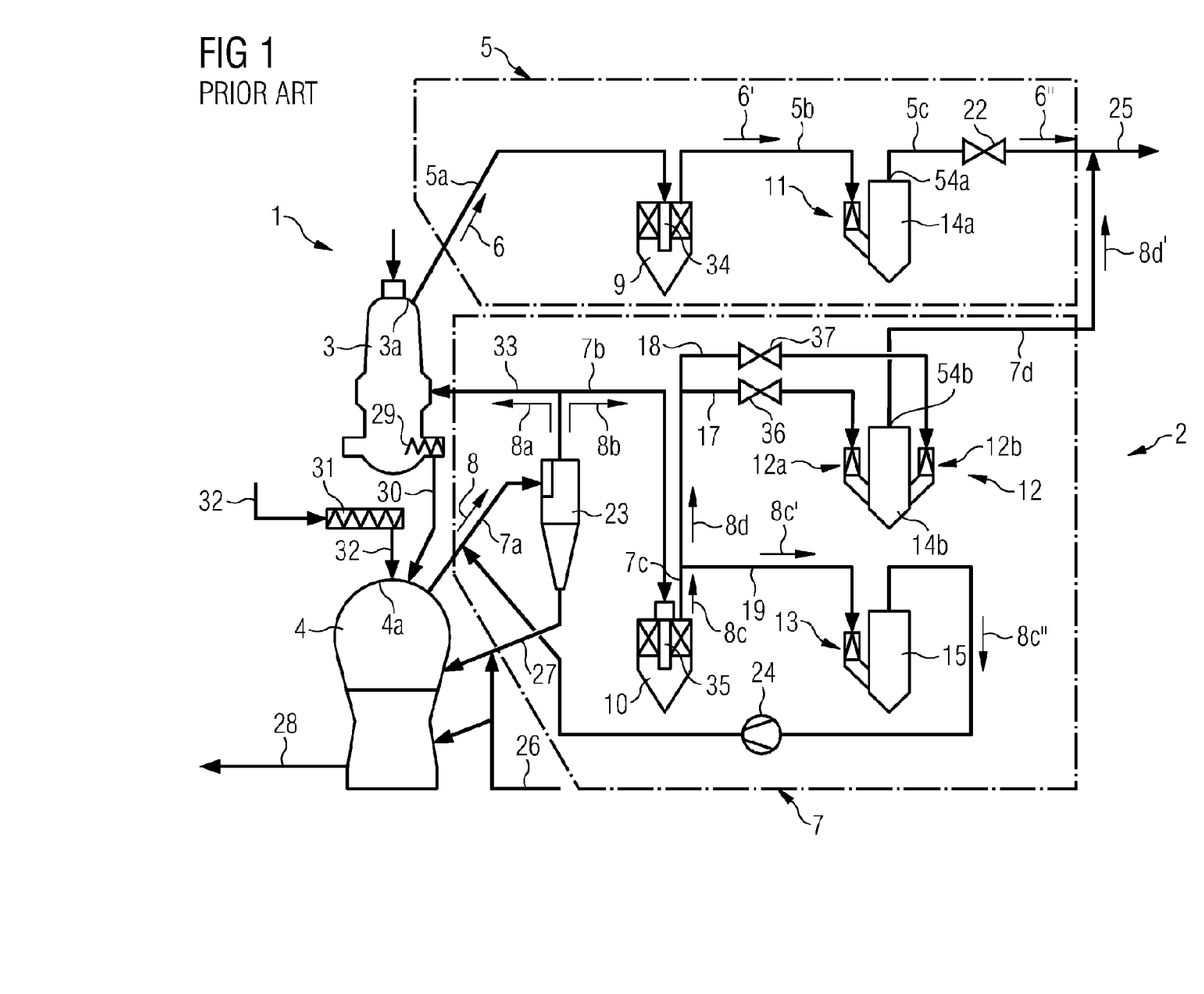
FIG. 1 shows a schematic representation of a smelting reduction installation, with a process gas cleaning device connected thereto, according to the prior art.

FIG. 1 shows a two-stage smelting reduction installation 1 according to the prior art, operating on the basis of the COREX process. This smelting reduction installation 1, used for obtaining pig iron or primary steel products, comprises a reduction reactor 3 and a melter gasifier 4 together with a process gas cleaning system 2.

The reduction reactor 3 is a vessel in the form of a shaft, into which metallurgical charge materials or pieces of lump ore 30 are filled together with any additives.

The reduction reactor 3 has in its bottom region a discharge opening, through which the metallurgical charge materials 30 can be charged by means of a conveying screw 29 into the melter gasifier 4 arranged underneath the reduction reactor 3. In a hood region 3a, the reduction reactor 3 is connected to a first line system 5, which serves for carrying away blast-furnace gas 6.

It should be noted that, apart from the COREX process, there are a series of related or further-developed smelting reduction processes in the case of which departures from the smelting reduction installation 1 represented in the present exemplary embodiment are envisaged in terms of structural design or process engineering.

While only a single reduction reactor 3 is provided in the case of a smelting reduction installation 1 operating on the basis of the COREX process, it is also possible in the case of alternative smelting reduction installations, for example operating on the basis of the FINEX process, for four reduction reactors arranged in series to be provided, for example, in which a staged pre-reduction of the metallurgical charge materials 30 takes place by the fluidized bed process before they are supplied to the melter gasifier 4.

The melter gasifier 4 is a vessel which has a refractory lining on its inside and the hood region 4a of which has three openings. A first opening is used for transporting metallurgical charge materials 30 into the melter gasifier 4. A second opening is used for transporting coal or material containing carbon 32 into the melter gasifier 4 by means of a charging device 31.

By firing the carbon-containing materials 32 gasified with oxygen by way of an oxygen line 26, a process gas referred to hereafter as generator gas 8 is generated within the melter gasifier 4. The generator gas 8 primarily comprises carbon monoxide (CO) and hydrogen ($H_2$) and is removed through a first line portion 7a of a second line system 7, using a third opening in the hood region 4a of the melter gasifier 4. The predominant fraction of the generator gas 8 removed in such a way is rendered usable as reduction process gas and introduced into the reduction reactor 3 by way of a supply line 33. The metallurgical charge materials 30 kept in the reduction reactor 3 are chemically reduced by the gassing with the generator gas 8 or the oxidative iron ores are reduced to what is known as "sponge iron".

By means of the conveying screw 29, this solid sponge iron is then continuously sent down a dropping shaft into the melter gasifier 4, where it undergoes final reduction or smelting. In a way similar to in the case of a conventional blast-furnace process, the molten pig iron accumulates together with slag 28 in the bottom region of the melter gasifier 4 and can finally be tapped off from the latter and cast into semi-finished products.

Since, however, the generator gas 8 removed from the melter gasifier 4 is very hot and would bring about agglutination of the metallurgical charge materials 30 kept in the reduction reactor through fine dusts entrained in the generator gas 8 that have become softened as a result of the high temperatures of about 1100° C., the generator gas 8 is first passed by way of a hot-air cyclone 23. The hot-air cyclone 23 is a vessel in which the generator gas 8 is cooled to about 800-850° C. and partially dedusted. The generator gas dust collected in the hot-air cyclone 23 is returned by way of a dust return line 27 into the melter gasifier 4, where it is burned together with oxygen introduced by way of the oxygen line 26.

While approximately 80% of the amount of the generator gas 8 flowing out of the melter gasifier 4 or out of the hot-air cyclone 23 is passed into the reduction reactor 3 as reduction process gas 8a, approximately 20% of the generator gas 8 (depicted as amount of generator gas 8b) is passed by way of a second line portion 7b of the second line system 7 to a pre-scrubbing device 10, in which the amount of generator gas 8b is further cooled and pre-cleaned. Arranged within the pre-scrubbing device 10, also referred to as a "quench scrubber", are packs of lamellae, preferably produced from wood, which are sprayed with water by means of a nozzle device 35. The water trickling down the packs of lamellae is removed together with the bound dust from the amount of generator gas 8b by way of an outflow tube (not represented) and subjected to further processing.

The generator gas 8c pre-cooled and pre-cleaned in such a way is removed from the pre-scrubbing device 10 by way of a third line portion 7c of the second line system 7. The third line portion 7c of the second line system 7 branches in turn into three feed lines 17, 18, 19, wherein the predominant fraction of the generator gas 8c pre-cooled and pre-cleaned in the pre-scrubbing device 10, that is to say about 95% (depicted in FIG. 1 and FIG. 2 as amount of generator gas 8c') is fed by way of the third feed line 19 into a cooling circuit for cooling the generator gas 8 flowing directly out of the melter gasifier 4.

The remaining fraction of the generator gas 8c pre-cooled and pre-cleaned in the pre-scrubbing device 10 (depicted in FIG. 1 and FIG. 2 as amount of generator gas 8d), which fluctuates between 1% and 5% depending on the combustion processes taking place at a given time in the melter gasifier 4, is sent further in the direction of a second wet scrubber system 12. The outflow of this amount of generator gas 8d is controlled by means of a pressure control system, described in still more detail below, in such a way that an operating pressure desired in the melter gasifier 4, for example of 5 bar, remains constant.

Here, the amount of generator gas 8d required for controlling the operating pressure of the melter gasifier 4, also referred to as "excess gas", is sent from the third line portion 7c of the second line system 7 further in the direction of the first feed line 17 and the second feed line 18.

It should be noted that, instead of provision of a number of feed lines 17, 18, it would in principle also be conceivable to provide a single feed line, leading to the second wet scrubber system 12.

In a way similar to the generator gas 8 removed from the melter gasifier 4 by way of the second line system 7, the blast-furnace gas 6 removed from the hood region 3a of the reduction reactor 3 by way of a first line portion 5a of the first line system 5 is also cleaned and cooled. For this, the blast-furnace gas 6 is first passed here by way of a pre-scrubbing device 9 of the first line system 5, the construction and operating mode of which has already been described on the basis of the pre-scrubbing device 10 of the second line system 7.

The blast-furnace gas 6' pre-cleaned and cooled in the pre-scrubbing device 9 of the first line system 5 is then passed by way of a second line portion 5b of the first line system 5 into a first wet scrubber system 11, which substantially corresponds in terms of its construction and its mode of operation to the second wet scrubber system 12 of the second line system 7, carrying the generator gas 8.

Figure 4:
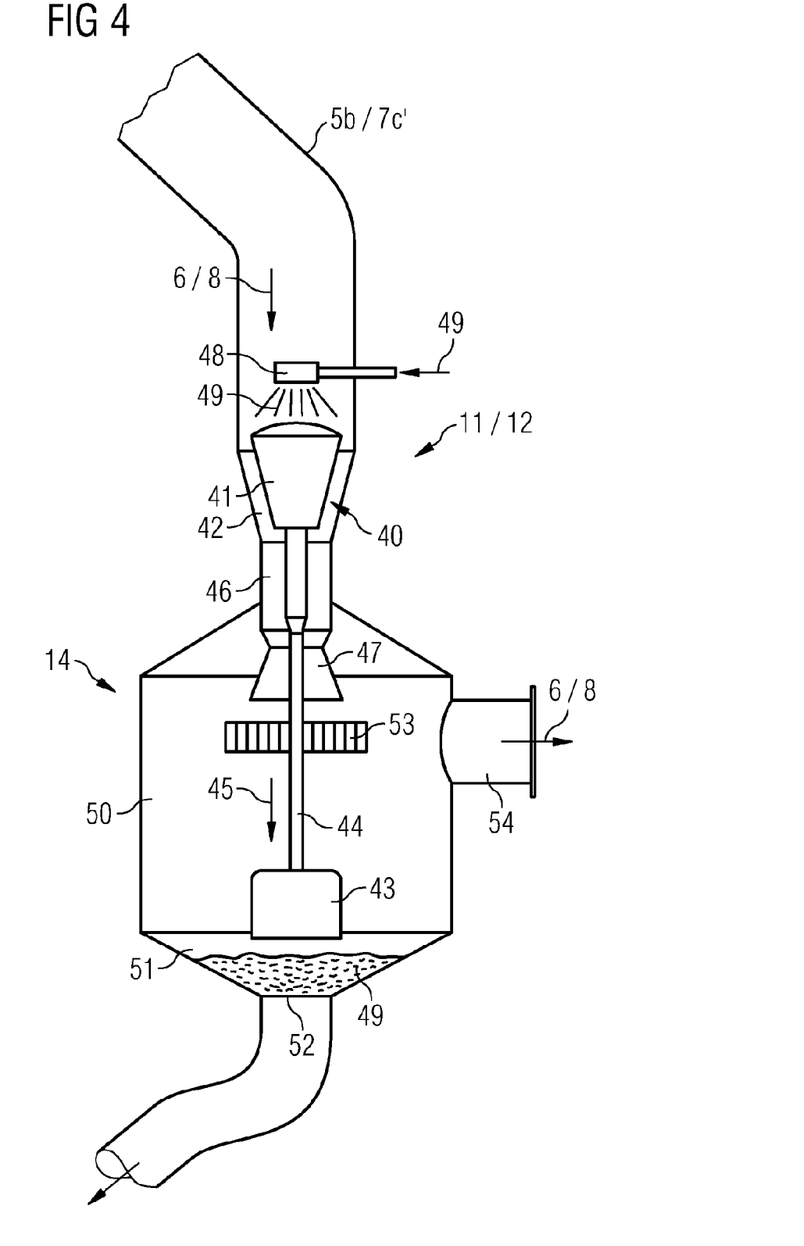
FIG. 4 shows a schematic representation of an annular gap scrubber system, arranged upstream of the droplet separating device, according to the prior art.

The basic construction of such a wet scrubber system 11 or 12, formed according to the present exemplary embodiment as an annular-gap scrubber system, and also corresponding to the prior art, is represented in FIG. 4: the respective process gas—that is to say the blast-furnace gas 6 or the generator gas 8—is passed by way of respectively assigned line portions 5b/7c' through a flue 42, which is preferably tapered conically in the direction of flow of the process gas 6/8 and within which a control element 41 is arranged. The control element 41 has a form corresponding to the peripheral surface of the flue 42 and is likewise configured so as to be tapered conically in the direction of flow of the process gas 6/8. Formed between the control element 41 and the flue 42 is a control gap 40.

The control element 41 is mounted in an axially displaceable manner within the flue 42 and is articulated by means of a push rod 44 on a drive unit 43, configured for example as a hydraulic device or as a servo motor, in order to be able to change the control 40 as desired in the width of its gap. If the control element 41 is adjusted by means of the drive unit in the direction of the arrow 45, the gap width of the control gap 40 is made smaller, since the peripheral surface of the control element 41 running substantially parallel to the peripheral surface of the flue 42 approaches the peripheral surface of the flue 42. In the converse way, that is to say with adjustment of the control element 41 counter to the direction of the arrow 45, the gap width of the control gap 40 can be made larger.

It goes without saying that it is also possible to arrange a number of control elements 41 together with corresponding flues 42 one after the other in the form of stages.

Arranged upstream of the control element 41 is a nozzle device 48 for injecting a scrubbing or cooling liquid 49, by means of which the blast-furnace gas 6 and the generator gas 8 (to be more precise the amount of generator gas 8d or the "excess gas") can be sprayed. By means of the scrubbing or cooling liquid 49, the blast-furnace gas 6 or the generator gas 8 pre-cooled and pre-cleaned in the pre-scrubbing devices 9 and 10 is further cooled and cleaned. The pre-scrubbing devices 9 and 10 primarily perform a cooling function here, and only an insignificant cleaning function, while the actual cleaning of the blast-furnace gas 6 or generator gas 8 is undertaken by the wet scrubber systems 11 and 12.

The conically tapered flue 42 of the wet scrubber system 11/12 goes over into a substantially cylindrical passage portion 46, which in turn goes over into a mouth portion 47, widening in a funnel-shaped manner in the direction of flow of the blast-furnace gas 6/generator gas 8, wherein the mouth portion 47 opens out in a droplet separating device 14.

The droplet separating device 14 comprises a substantially cylindrical housing 50, by means of which the scrubbing or cooling liquid 49 introduced into the respective wet scrubber system 11, 12 and mixed with impurities or dusts of the blast-furnace gas 6 or of the generator gas 8 can be collected and removed.

Various baffle attachments or flow straighteners 53 may be arranged within the housing 50 of the droplet separating device 14.

Figure 2:
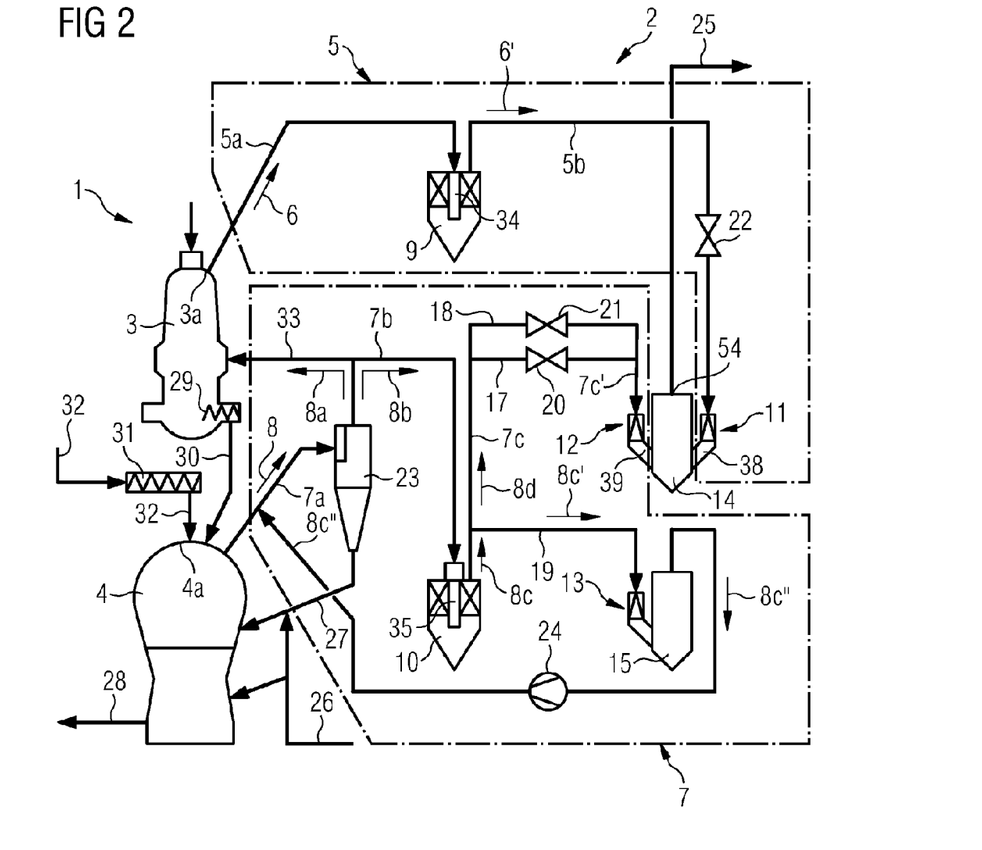
FIG. 2 shows a schematic representation of a smelting reduction installation, with a process gas cleaning device connected thereto, according to the invention.

Using an outlet opening 54 in the housing 50 of the droplet separating device 14, the blast-furnace gas 6 or generator gas scrubbed and cooled in such a way is sent further in the direction of an export gas line 25, which can be seen in FIGS. 1 and 2.

The dusts entrained in the blast-furnace gas 6 or in the generator gas 8 are wetted by the scrubbing or cooling liquid 49 and captured in a bottom region 51 of the housing 50 of the droplet separating device 14, where they are removed by way of an outflow 52, together with the scrubbing or cooling liquid 49 injected into the line portions $5b/7c'$, and taken away for disposal.

A process gas cleaning device 2, shown in FIG. 1, of a smelting reduction installation 1 according to the prior art is set out in such a way that the first wet scrubber system 11 of the first line system 5, carrying the blast-furnace gas 6, and the second wet scrubber system 12 of the second line system 7, carrying the generator gas 8, are respectively followed downstream by their own droplet separating device 14a, 14b, as represented in FIG. 4. Therefore, according to the prior art, the first wet scrubber system 11 and the second line portion 5b of the first line system 5 open out in a first droplet separating device 14a, while the second wet scrubber system 12 and the feed lines 17, 18, branching off from the third line portion 7c of the second line system 7, open out in a second droplet separating device 14b.

In the configuration as shown in FIG. 1, the second wet scrubber system 12 comprises two annular-gap scrubbers 12a, 12b, wherein the first feed line 17 opens out into a first annular-gap scrubber 12a of the second wet scrubber system 12 and the second feed line 18 opens out into a second annular-gap scrubber 12b of the second wet scrubber system 12. Similarly, however, the second wet scrubber system 12 could also simply have a single annular-gap scrubber, opening out into the first droplet separating device 14a.

In any event, the already cleaned and cooled blast-furnace gas 6" (the "top gas"), removed by way of the outlet opening 54a of the first droplet separating device 14a, is passed by way of a third line portion 5c of the first line system 5 to the export gas line 25, while the already cleaned and cooled amount of generator gas $8d'$ (the "excess gas"), removed by way of an outlet opening 54b of the second droplet separating device 14b, is passed by way of a fourth line portion 7d of the second line 7 to the export gas line 25. For this, the blast-furnace gas 6" is united here with the generator gas $8d'$, or the third line portion 5c of the first line system 5 is united with the fourth line portion 7d of the second line system 7 in a crossing region 55.

The cleaned and cooled amounts of blast-furnace gas and generator gas 6" and $8d'$ are therefore brought together and passed on for further use in the form of an export gas by way of the export gas line 25.

Figure 5:
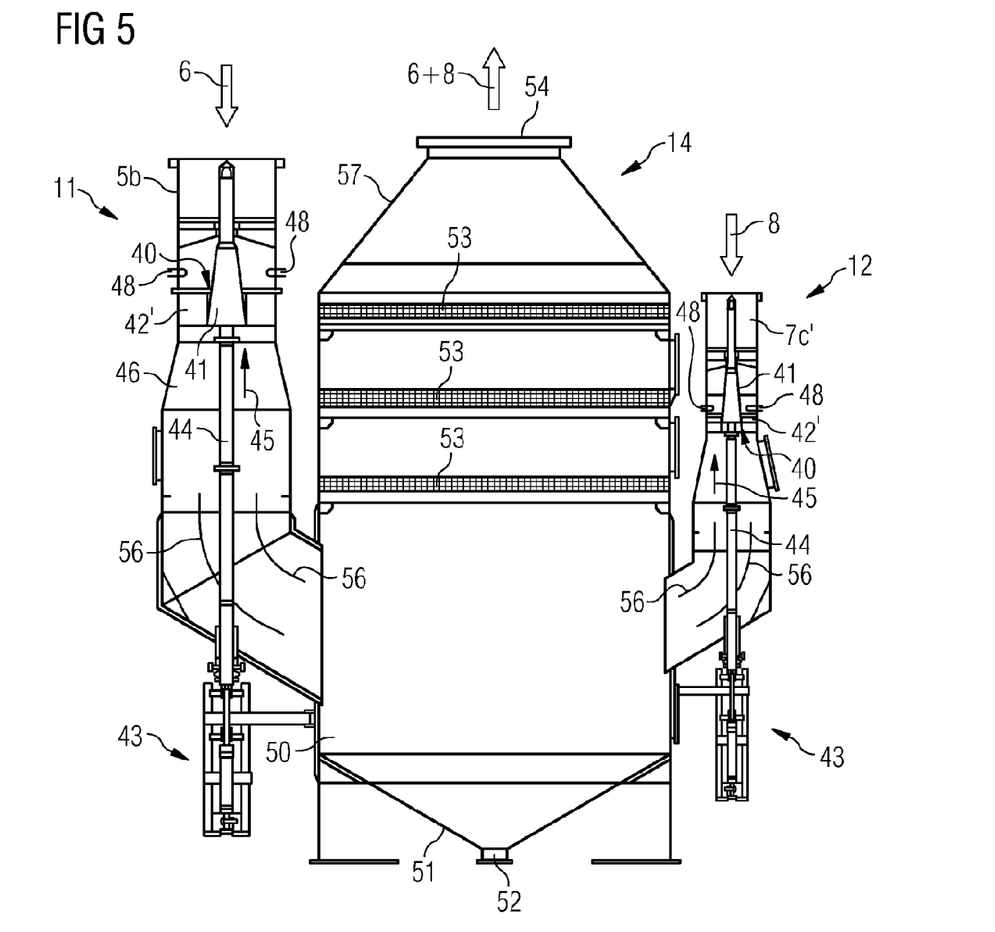
FIG. 5 shows a sectional representation of a droplet separating device according to the invention, together with two wet scrubber systems connected thereto.
Figure 6:
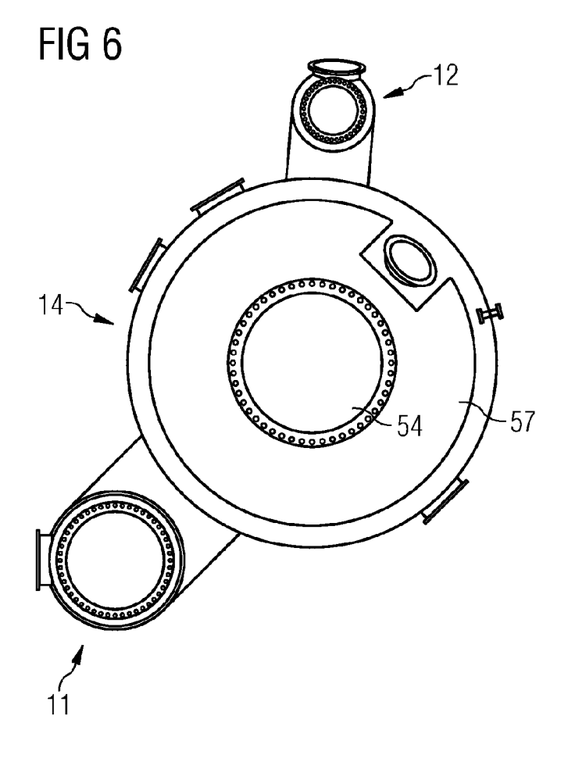
FIG. 6 shows a plan view of the droplet separating device as shown in FIG. 5.

As a difference from this, in the case of a process gas cleaning device 22 according to the invention of a smelting reduction installation 1 as shown in FIG. 2, a common droplet separating device 14 is provided, into which both the first wet scrubber system 11 of the first line system 5, carrying the blast-furnace gas 6, and the second wet scrubber system 12 of the second line system 7, carrying the generator gas 8, open out (see FIG. 5 and FIG. 6).

The first wet scrubber system 11 and the second line portion 5b of the first line system 5 therefore open out in the same droplet separating device 14 in which the second wet scrubber system 12 and the feed lines 17, 18, branching off from the third line portion 7c of the second line system 7, open out. This means that only a single housing 50 has to be provided to collect and remove the impurities and dusts of the blast-furnace gas 6' (of the "top gas") and of the amount of generator gas 8d (of the "excess gas") bound by means of the scrubbing or cooling liquid 49.

Therefore, in the case of a smelting-reduction-installation process gas cleaning device 2 according to the invention as shown in FIG. 2, the export gas line 25 can therefore be connected directly to the outlet opening 54 of the droplet separating device 14, since the blast-furnace gas 6' removed from the reduction reactor 3 and the amount of generator gas 8d removed from the melter gasifier 4 are already brought together or swirled together within the droplet separating device 14—or already in the region arranged upstream of the droplet separating device 14 (see also FIG. 5).

The cleaned and cooled amounts of blast-furnace gas 6' and generator gas 8d are passed on for further use in the form of an export gas by way of the export gas line 25. The export gas transported away from the smelting reduction installation by way of the export gas line 25 can be rendered usable here for further generation of energy or heat and be supplied to various generators or heating installations as a firing medium. In particular, the component of the export gas provided by the amount of generator gas $8d'$, or the "excess gas", is a very high-quality energy source, since that amount of generator gas $8d'$ has a relatively low $CO_2$ content, by contrast with the generator gas 6", or "top gas", that has already been relatively used up by the sponge iron reduction process in the reduction reactor 3.

Instead of a single annular-gap scrubber, the first wet scrubber system 11 and the second wet scrubber system 12 may also respectively comprise a number of annular-gap scrubbers. In the case of such provision of a number of annular-gap scrubbers per wet scrubber system 11 and 12, all the annular-gap scrubbers would open out into the common droplet separating device 14.

The first wet scrubber system 11, the second wet scrubber system 12 and the droplet separating device 14 may be arranged in a compact way in a common scrubbing tower, for example of concrete or sheet metal.

Figure 3:
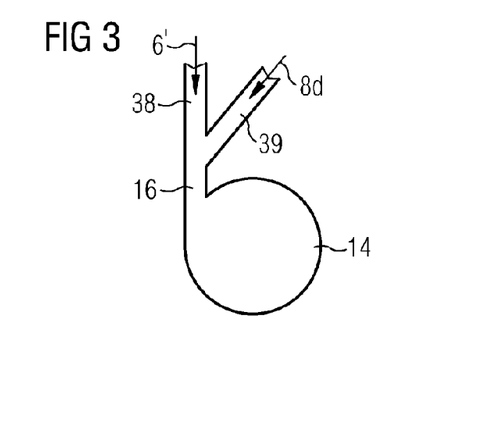
FIG. 3 shows a simplified representation of a droplet separating device according to the invention in plan view.

In a preferred configurational variant of the invention, it is provided that a first outflow line 38, arranged downstream of the first wet scrubber system 11 of the first line system 5, and a second outflow line 39, arranged downstream of the second wet scrubber system 12 of the second line system 7, are brought together in a collector line portion 16 and the collector line portion 16 opens out into the droplet separating device 14 (see FIG. 3).

For this, the collector line portion 16 opens out substantially tangentially into the peripheral region of the substantially cylindrically configured housing 50 of the droplet separating device 14, in order to achieve ideal droplet separation of the swirled blast furnace gas 6 or generator gas 8.

As can be seen in FIG. 5, the wet scrubber systems 11 and 12 connected to the droplet separating device 14 according to the invention have a number of differences in terms of structural design in comparison with the wet scrubber system according to the prior art, described on the basis of FIG. 4. For instance, the flue 42 surrounding the control element 41 is created by cylindrical or plate-shaped internal elements 42' arranged within the line portions 5b and 7c'. The internal elements 42' respectively have a cylindrical bore, the control gap 40 being formed between the control element 41 and an inner wall of the internal elements 42' formed by the cylindrical bore. If the control element 41 is adjusted by means of the hydraulic drive unit 43 in the direction of the arrow 45, the gap width of the control gap 40 is made smaller.

Arranged within the passage portions 46 of the line portions 5b and 7c' are respectively curved baffle plates 56, in order to minimize flow and pressure losses.

While the scrubbing or cooling liquid 49 mixed with dusts or impurities of the blast-furnace gas 6 and of the generator gas 8 is removed by way of an outflow 52 arranged in the bottom region 51 of the housing 50 of the droplet separating device 14, the scrubbed and cooled blast-furnace gas 6 and the generator gas 8 is sent further in the direction of the export gas line 25 by way of an outlet opening 54 of the housing 50 arranged in the hood region 57 of the droplet separating device 14. The scrubbed and cooled blast-furnace gas/generator gas mixture 6+8 is therefore removed vertically upward through the droplet separating device 14.

The exemplary embodiment as shown in FIGS. 5 and 6 shows a simplified possibility for connecting the wet scrubber systems 11/12 to the droplet separating device 14, in which the wet scrubber systems 11/12 respectively open out substantially radially into the peripheral region of the cylindrical housing 50 of the droplet separating device 14. It goes without saying that the wet scrubber systems 11/12 and the respectively assigned line portions 5b/7c' that are represented in FIGS. 5 and 6 may also open out tangentially into the peripheral region of the housing 50, for example as already described on the basis of the schematic representation in FIG. 3.

The control of the operating pressure of the melter gasifier 4 takes place by conventional actual-value/set-value comparison by means of a closed-loop control circuit, wherein an appropriate control intervention takes place in accordance with pressure deviations hereby determined, in the form of an adjustment of the control element 41 described on the basis of FIG. 4 or an increase or reduction in the size of the control gap 40.

Integrated for this here in the second line system 7, in the region of a first feed line 17 arranged upstream of the second wet scrubber system 12, is a pressure control device 20, by means of which an operating pressure desired in the melter gasifier 4, of 5 bar for example, is kept constant by the throughflow of the generator gas 8 being correspondingly controlled.

If, therefore, the respectively desired operating pressure in the melter gasifier 4 drops, the throughflow of the amount of generator gas 8 or of the "excess gas" is throttled by corresponding adjustment of the control element 41 in the direction of the arrow 45 as shown in FIG. 4.

The second wet scrubber system 12 has an unclosable leakage gap, through which a permanent outflow of generator gas 8 is made possible—irrespective of the position of the control element 41 within the flue 42. The control gap 40 therefore cannot be closed completely, but must remain permanently open by a certain minimum gap width, in order to permit an outflow of condensed liquid transported within the second line system 7.

Since the amount of generator gas 8d can vary considerably, depending on the sometimes incalculable processes within the melter gasifier 4, pressure control systems according to the prior art often proved to be inadequate or insufficiently flexible.

In the case of a control system corresponding to the prior art as shown in FIG. 1, both the first feed line 17 and the second feed line 18 of the second line system 7 are provided with a shut-off valve 36, 37. Depending on the respectively given amount of generator gas 8d, one of the shut-off valves 36, 37 and one of the feed lines 17, is opened and the amount of generator gas 8d is passed either to the first annular-gap scrubber 12a or to the second annular-gap scrubber 12b. The two annular-gap scrubbers 12a and 12b are made to different dimensions here. For example, the annular-gap scrubber 12a, fed by the first feed line 17, may be designed for small amounts of generator gas 8d to flow through, while the annular-gap scrubber 12b, fed by the second feed line 18, is designed for larger amounts of generator gas 8d to flow through. Given a relatively small amount of generator gas 8d, the first shut-off valve 36 may be opened here and the second shut-off valve 37 may be closed, so that the entire amount of generator gas 8d flows through the first feed line 17 and through the first annular-gap scrubber 12a. Given a relatively large amount of generator gas 8d, on the other hand, the second shut-off valve 37 is also opened, consequently the second feed line 18 is also released for the amount of generator gas 8d to flow through, so that the amount of generator gas 8d therefore flows both through the first annular-gap scrubber 12a and through the second annular-gap scrubber 12b. Such a pressure control system therefore requires the provision of a number of annular-gap scrubbers 12a, 12b.

On the other hand, in the case of a pressure control system according to the invention as shown in FIG. 2, the feed lines 17 and 18 are united again in a line portion 7c' and open out into a single annular-gap scrubber 12. This makes it possible to dispense with one annular gap scrubber, or means that the provision of a second annular-gap scrubber 12b, as represented in FIG. 1, is no longer necessary.

As shown in FIG. 2, integrated in the second line system 7, in the region of the first feed line 17, is an already mentioned pressure control device 20, which may be a commercially available throttle valve.

Furthermore, the second feed line 18, arranged parallel to the first feed line 17, is provided with a bypass valve 21, by means of which the second feed line 18 is closed in the case of an amount of generator gas passed through the second line system or through the third line portion 7c of the second line system 7 at a given time going below a defined amount of generator gas 8d.

On the other hand, the second feed line 18 may be opened by means of the bypass valve 21 in the case of the occurrence of an amount of generator gas 8d passed through the second line system 7 at a given time going above the defined amount of generator gas 8d. The operating pressure control is from then on performed by adjusting the control element 41 of the second wet scrubber system 12 or by varying the control gap 40.

Since the control gap 40 must never be fully closed for the reasons stated above, in the event that no great amounts of generator gas 8d have to be removed through the second line system 7 in the direction of the export line 25 there is an undesired loss of generator gas 8 (of very high value in comparison with the blast-furnace gas 6 of the first line system 5), which of course is in fact intended to be used for a pre-reduction of the charge materials located in the reduction reactor 3 and not for a secondary use or for firing.

By means of a pressure control system according to the invention, this loss of generator gas 8, which in the case of a smelting reduction installation 1 according to the prior art is about 1000 m³/h, can be significantly reduced. This is so since, in the case of relatively small amounts of generator gas 8d passed through the third line portion 7c of the second line system 7 at a given time, the second feed line 18 can be closed by means of the bypass valve 21, so that fine control of the amount of generator gas 8d then flowing exclusively through the first feed line 17 can take place by means of the pressure control device 20.

A further advantage of the pressure control system according to the invention is its flexibility. This is so since, even in the case of a sudden drastic increase in pressure in the melter gasifier 4, and consequently a large amount of generator gas 8d to be removed by way of the third line portion 7c of the second line system 7, this pressure can be quickly relieved or a corresponding amount of generator gas 8d can be quickly removed in the direction of the export line 25 by the bypass valve 21 or the second feed line 18 being opened, so that the amount of generator gas 8d to be removed can be passed unhindered to the second wet scrubber system 12 by way of the second feed line 18. The pressure control is from then on performed by adjusting the control element 41 of the second wet scrubber system 12 or by varying the control gap 40.

The first line system 5 is equipped in the region of the second line portion 5b, arranged upstream of the first wet scrubber system 11, with a flow control device 22, by means of which the inflow of the blast-furnace gas 6 removed from the reduction reactor 3 to the first wet scrubber system 11 can be controlled. The flow control device 22 is intended to permit an outflow of blast-furnace gas 6 from the reduction reactor 3 that is as uniform as possible, so that the material flow of the charge materials or pieces of lump ore located within the reduction reactor 3 does not take place too quickly but also does not break off.

The flow control device 22 provided within the first line system 5 and the pressure control device 20 provided within the second line system 7 also serve for setting a desired export gas pressure in the export gas line 25. The export gas line 25 may lead to a gas system or else to a storage tank, in which the process gases obtained from the process gas cleaning device 2 of the smelting reduction installation 1 are collected.

The amount of generator gas 8c' branched off from the pre-scrubbing device 10 of the second line system 7 and fed into the already mentioned cooling circuit by means of the third feed line 19 is also scrubbed and further cooled, to be specific in a separate annular-gap scrubber 13 together with an additional droplet separator 15, which however is of secondary importance in connection with the present invention.

The invention claimed is:

1. A process gas cleaning device for a smelting reduction installation for obtaining pig iron, comprising:
    at least one reduction reactor,
    a first line system for carrying away a blast-furnace gas from the reduction reactor;
    a melter gasifier,
    a second line system for carrying away a generator gas from the melter gasifier;
    respective pre-scrubbing devices for pre-cleaning the blast-furnace gas and the generator gas are arranged within the first and second line systems;
    a wet scrubber system to which the first and second line systems respectively lead, the wet scrubber system is an annular-gap scrubber system for subjecting pre-cleaned blast-furnace gas or pre-cleaned generator gas to scrubbing or cooling liquid,
    one or more control elements for throttling throughflow of the blast-furnace gas or of the generator gas, by the control elements varying a control gap and wherein the scrubbing or cooling liquid which is introduced into the wet scrubber systems and mixed with impurities or dusts of the blast-furnace gas or of the generator gas is collected and removed;
    a droplet separating device, into which both the first wet scrubber system of the first line system, carrying the blast-furnace gas, and the second wet scrubber system of the second line system, carrying the generator gas open out
    a common scrubbing tower in which the first wet scrubber system and the second wet scrubber system and the droplet separating device are arranged.

2. The process gas cleaning device for a smelting reduction installation as claimed in claim 1, further comprising a first outflow line downstream of the first wet scrubber system of the first line system, and a second outflow line downstream of the second wet scrubber system of the second line system, the first and second outflow lines are brought together in a collector line portion, and the collector line portion opens out into the common droplet separating device.

3. The process gas cleaning device for a smelting reduction installation as claimed in claim 2, wherein the droplet separating device is substantially cylindrically configured, and the collector line portion opens out substantially tangentially into a peripheral region of a substantially cylindrically configured droplet separating device.

4. The process gas cleaning device for a smelting reduction installation as claimed in claim 1 further comprising the second line system includes a first feed line, in a region of the first feed line which is upstream of the second wet scrubber system, a pressure control device in the second line system for keeping a selected operating pressure in the melter gasifier constant by controlling throughflow of the generator gas,
    the second wet scrubber system having an unclosable leakage gap permitting a permanent outflow of generator gas irrespective of a selected position of a control element for reducing or widening a control gap.

5. The process gas cleaning device for a smelting reduction installation as claimed in claim 4, further comprising a second feed line, arranged parallel to the first feed line and leading to the second wet scrubber system, a bypass valve in the second feed line for closing the second feed line when an amount of generator gas passed through the second line system at a given time is below a defined amount of generator gas and for opening the second feed line when an amount of generator gas passed through the second line system at a given time is above the defined amount of generator gas.

6. The process gas cleaning device for a smelting reduction installation as claimed in claim 1, wherein the second wet scrubber system, assigned to the second line system or the generator gas, has a single annular-gap scrubber or a single control element varying an annular gap.

7. The process gas cleaning device for a smelting reduction installation as claimed in claim 1 further comprising the first line system is in a region of a line portion of and upstream of the first wet scrubber system, the first line system includes a flow control device for controlling inflow of the blast-furnace gas removed from the reduction reactor to the first wet scrubber system.

8. A method for process gas cleaning of a smelting reduction installation for obtaining pig iron, comprising:
    removing blast-furnace gas from one or more reduction reactors by a first line system,
    removing generator gas from a melter gasifier by a second line system pre-cleaning and cooling the removed blast furnace gas and generator gas by one or more pre-scrubbing devices, leading the first and second line systems respectively to a wet scrubber system formed as an annular-gap scrubber system and in which the pre-cleaned and cooled blast-furnace gas or the pre-cleaned and cooled generator gas is subjected to scrubbing or cooling liquid;

throttling the amount of throughflow of the pre-cleaned and cooled blast-furnace gas or of the pre-cleaned and cooled generator gas by one or more control elements varying a control gap and collecting and removing the scrubbing or cooling liquid mixed with impurities of the pre-cleaned and cooled blast-furnace gas or of the pre-cleaned and cooled generator gas;

passing the pre-cleaned and cooled blast-furnace gas by the first wet scrubber system and subjecting the blast-furnace gas to scrubbing or cooling liquid and passing the pre-cleaned and cooled generator gas by second wet scrubber system and subjecting the generator gas to scrubbing or cooling liquid and feeding the gas to a common droplet separating device, passing the blast-furnace gas by the first wet scrubber system and passing the generator gas by the second wet scrubber system, the gases already being brought together before entry into a droplet separating device.

9. The method for the process gas cleaning of a smelting reduction installation as claimed in claim 8, wherein the process gas obtained upstream of the droplet separating device from the blast-furnace gas and the generator gas are brought together and are then passed substantially tangentially into the peripheral region of a substantially cylindrically configured droplet separating device.

10. The method for the process gas cleaning of a smelting reduction installation as claimed in claim 8 further comprising controlling pressure of the generator gas in the second line system in the region of a first feed line, arranged upstream of the second wet scrubber system for keeping an operating pressure in the melter gasifier constant, and permanent outflow of generator gas in the second wet scrubber system occurs by an unclosable leakage gap there.

11. The method for the process gas cleaning of a smelting reduction installation as claimed in claim 10, further comprising:

passing the generator gas by a second feed line which is in parallel to the first feed line and also leads to the second wet scrubber system, closing the second feed line by a bypass valve when an amount of generator gas passed through the second line system at a given time is below a defined amount of generator gas, while opening the second feed line by the bypass valve when an amount of generator gas passed through the second line system at a given time is above the defined amount of generator gas, wherein the operating pressure control is thereafter performed by means of adjusting a control element of the second wet scrubber system.

12. The method for the process gas cleaning of a smelting reduction installation as claimed in claim 8 further comprising:

controlling a flow of the blast-furnace gas in the first line system in the region of a line portion arranged upstream of the first wet scrubber system.

* * * * *

UNITED STATES PATENT AND TRADEMARK OFFICE
CERTIFICATE OF CORRECTION

PATENT NO. : 8,496,729 B2  
APPLICATION NO. : 13/000688  
DATED : July 30, 2013  
INVENTOR(S) : Kang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this

Fifteenth Day of September, 2015

Michelle K. Lee
*Director of the United States Patent and Trademark Office*